United States Patent [19]

Villemin

[11] 4,089,941

[45] May 16, 1978

[54] STEAM REFORMER PROCESS FOR THE PRODUCTION OF HYDROGEN

[75] Inventor: Bernard Villemin, Toulouse, France

[73] Assignee: A.P.C. (Azote et Produits Chimiques) Catalysts & Chemicals Europe Societe, Paris, France

[21] Appl. No.: 734,014

[22] Filed: Oct. 19, 1976

[30] Foreign Application Priority Data

Oct. 22, 1975 France .................................. 75 32280

[51] Int. Cl.$^2$ .............................................. C01B 1/18
[52] U.S. Cl. .................................... 423/654; 252/373; 252/466 J
[58] Field of Search ................ 423/654, 653; 252/373, 252/466 J, 477 R

[56] References Cited

U.S. PATENT DOCUMENTS

| 2,425,754 | 8/1947 | Murphree et al. ................. 423/654 |
| 2,937,077 | 5/1960 | Faatz et al. ....................... 423/654 |
| 3,370,914 | 2/1968 | Gross et al. ....................... 423/213.5 |
| 3,907,710 | 9/1975 | Lundsager ........................ 252/477 R |

Primary Examiner—Edward J. Meros
Attorney, Agent, or Firm—Millen & White

[57] ABSTRACT

An impregnated nickel catalyst for the steam reforming of gaseous hydrocarbons to produce hydrogen, comprising a support containing at least 98% of alumina, having the shape of a cylinder containing at least four partitions located in radial planes and in which the porosity ranges between 0.08 and 0.20 cm$^3$/g, and 4 to 15% of nickel calculated as NiO with respect to the total weight of the catalyst, deposited by impregnation on the support.

8 Claims, 2 Drawing Figures

STEAM REFORMER PROCESS FOR THE PRODUCTION OF HYDROGEN

BACKGROUND OF THE INVENTION

This invention relates to the production of hydrogen, and in particular to a new steam reformer catalyst and process for using same, in which the catalyst is based on nickel impregnated on a previously shaped support of alumina.

The steam reformer process is a conventional method for preparing bulk hydrogen or hydrogen-containing synthesis gases for the manufacture of ammonia or methanol or for the OXO process. Gaseous hydrocarbon is reacted in the presence of steam and optionally air in the presence of a nickel catalyst in a reformer furnace under pressures up to 50 bars at temperatures ranging between 500° and 1,000° C., the ratio steam/carbon in the reaction mixture generally ranging between 2 and 5. In an optional secondary reformer, the gas issuing from the primary reformer having a temperature of 750° – 800° C. and containing $H_2$, CO, $CO_2$, $H_2O$ and $CH_4$ is reequilibrated at temperatures up to 1,000° C. in order to reduce the methane content, the temperature being obtained by introducing air.

When employing methane, the reactions in the reformers are:

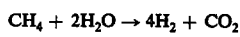

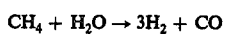

In addition to methane, other gaseous hydrocarbons can be used, e.g., natural gas, ethane, propane and butane.

Catalysts impregnated with nickel are manufactured by preparing a refractory support, soaking the prepared support in a nickel salt and calcinating the resultant catalyst in order to convert the nickel salt into nickel oxide. The advantages of such catalysts are known. For example, their activity, for the same nickel content is higher compared to catalysts where nickel is coprecipitated with the elements of the support. It is also unnecessary to reduce a calcined impregnated catalyst with hydrogen prior to use in order to convert the impregnated nickel oxide into nickel. Furthermore, the catalyst support can be prepared by ceramic methods which obtain a higher mechanical strength.

The catalysis rate is limited by the diffusion rate of the gaseous reagents in the catalyst elements. Therefore, attempts have been made to increase the contact area between the reagents and the catalyst. Whereas it is known that the contact surface increases with smaller catalyst elements, the pressure drop in the reformer furnace is deleteriously increased. To counteract the pressure drop, there have already been used ring-shaped elements having a large contact area but causing only a rather slight pressure drop. However, such ring-shaped elements are prepared by tabletting and their manufacture is costly.

SUMMARY OF THE INVENTION

An object of this invention is to provide an improved relatively inexpensive catalyst for the steam reformer (also called steam reforming) process for the production of hydrogen.

Another object is to provide a steam reformer process based on this improved catalyst.

Upon further study of the specification and appended claims, further objects and advantages of this invention will become apparent to those skilled in the art.

To attain these objects, there has now been found a catalyst which can be manufactured at lower cost, which has a large surface, and causes only a slight pressure drop in the reformer furnace. Furthermore, this catalyst has a particularly high catalytic activity and only a slight tendency to deactivation. Specifically, this catalyst, a nickel impregnated catalyst for primary or secondary reforming of gaseous hydrocarbons to produce hydrogen, comprises a support containing at least 98% of alumina, having the shape of a cylinder containing at least four partitions located in radial planes, and in which the porosity ranges between 0.08 cm$^3$/g and 0.20 cm$^3$/g, preferably between 0.12 cm$^3$/g and 0.15 cm$^3$/g and by 4 to 15% preferably 8 to 12% of nickel calculated as NiO with respect to the total weight of the catalyst, deposited by impregnation on the support.

The catalyst support contains at least 98% alumina and 0 to 2% of an oxide such as, for example, oxides of titanium, manganese, beryllium, zirconium, thorium, barium, calcium, sodium or potassium silica or their mixtures. The support is preferably made out of pure alumina. Any form of alumina can be used, α alumina being preferred.

BRIEF DESCRIPTION OF THE DRAWINGS

In FIG. 2, the dimensions of the catalyst are preferred and self evident by inspection.

DETAILED DESCRIPTION

Figure 1:
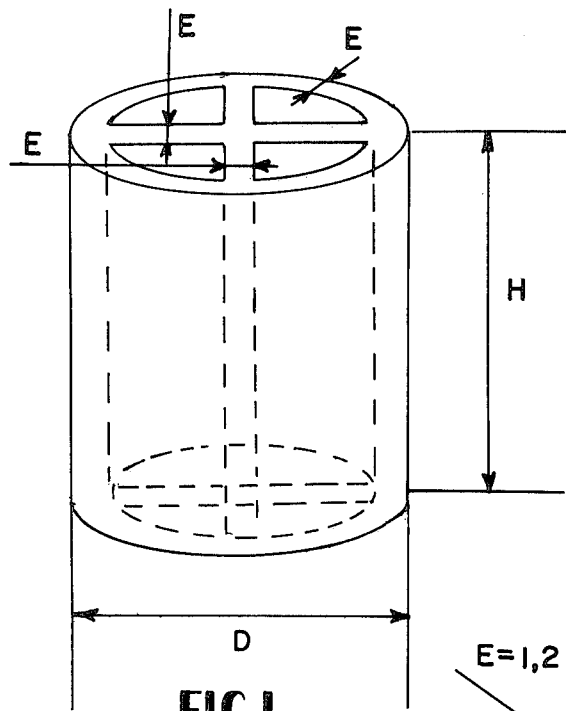
FIG. 1 and FIG. 2 are isometric views of catalyst elements of the invention. They comprise hollow cylinders, the catalyst illustrated by FIG. 1 containing four partitions disposed in diametric perpendicular planes which in cross-section, form a cross, and the catalyst illustrated in FIG. 2 containing 5 partitions disposed in radial planes at equal angles.
Figure 2:
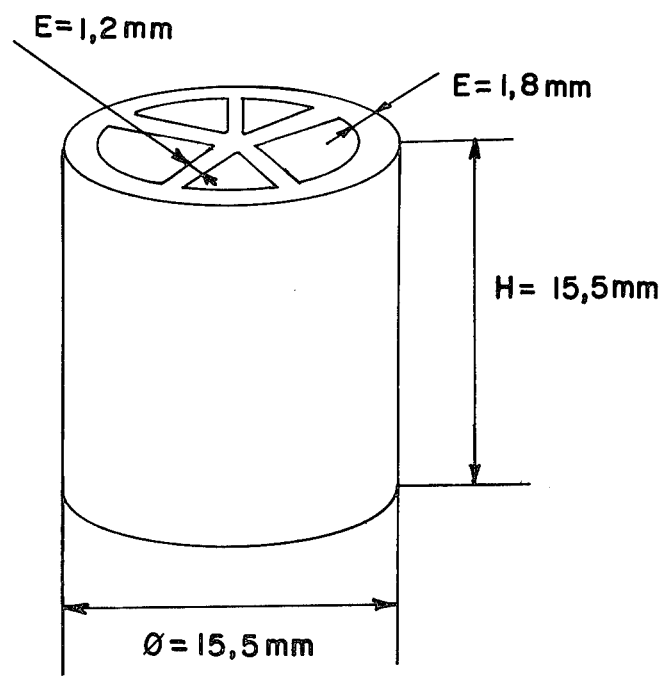

The cylinder contains at least 4 partitions. It preferably contains 4 to 7 partitions at equal angles. It must be noted, however, that the manufacture of the support becomes more difficult as the number of partitions increases. The size of the catalyst element is variable. For example, the diameter and height of a catalyst element containing four or five partitions ranges between 10 and 20 mm. Elements having a diameter higher than 20 mm contain preferably at least six partitions.

The porosity of the support before impregnation must range between 0.08 cm$^3$/g and 0.20 cm$^3$/g. For lower porosities, impregnation with a nickel salt generally cannot be suitably performed. For higher porosities, the mechanical strength of the support element is lower than 20 kg/cm$^2$ and as shown by practice, at least a strength of 20 kg/cm$^2$ is required to prevent crushing of the catalysts in the reformer furnace. The best results are usually obtained wth porosities ranging between 0.12 and 0.15 cm$^3$/g. (The porosity is the quantity of water (in cm$^3$) absorbed by one gram of catalyst.) Supports having a similar shape are described in French Published Appln. 2,226,256 of Nov. 15, 1974 for automobile exhaust catalysts, based on U.S. application Ser. No. 352,165 filed Apr. 18, 1973, now U.S. Pat. No. 3,907,710, issued Sept. 23, 1975 in the name of Christian Bent Lundsager.

For manufacturing the support, a gel of alumina is prepared by reacting an acid (acetic or nitric acid) with alumina monohydrate in the presence of water. To the thus-obtained alumina gel, there are added more particularly α-alumina, and optionally other oxides such as titanium or manganese oxides in order to obtain a ceramic paste. To obtain the desired consistency, there are added water or organic binders such as carboxymethylcellulose gel, alginates, thermoplastic materials such as polystyrene or polyvinyl chloride. The paste obtained is extruded and calcined at a temperature of 800° to 1,400° C.

The resultant support is then impregnated so as to contain about 4 to 15% by weight of nickel calculated as NiO. The catalytic activity becomes significant as the nickel content reaches about 4%. At above 15% nickel, it is difficult to deposit more nickel by impregnation, but even if feasible, the catalytic activity of nickel deposited by impregnation is such that it would not be profitable to use such higher quantities.

Impregnation is performed, for example, as follows. The support is soaked in a solution of nickel nitrate having a temperature of 60°–80° C. Alternatively, any soluble salt of nickel which can be decomposed at low temperature, such as the oxalate, formate or acetate can be used. The impregnated support is then heated to 400°–500° C. to decompose the nickel nitrate into NiO. These operations are repeated until the desired nickel content is obtained. It must be noted that by using the support of the invention, the number of operations necessary to reach a given nickel content is lower as compared to catalysts having the same composition but different shapes and porosity.

One of the advantages of the catalyst of the present invention is that it decreases the pressure drop in the reformer furnace and increases the contact surface with the reactants.

For example, the pressure drop was measured in a reforming tube containing first ring-shaped catalysts having a thickness and an external diameter of 15.9 mm and an internal diameter of 6.3 mm and afterwards a catalyst of the invention containing four partitions, the partitions and the cylindrical walls having a thickness of 1.5 mm and the external diameter being 16 mm. The pressure drop with the catalyst of the invention is equal to 71% of the pressure drop with the ring-shaped catalyst.

The contact surface of the invention catalyst and of the ring-shaped catalyst were also compared. The contact surface of the invention is superior by 33% to the contact surface of the ring-shaped catalyst.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever. In the following examples, all temperatures are set forth uncorrected in degrees Celsius; unless otherwise indicated, all parts and percentages are by weight.

Three types of catalysts having supports of various compositions and numbers of partitions were prepared.

TYPE A contains four partitions and has the following composition:
$Al_2O_3$: 98.10%
$TiO_2$: 0.72%
$Mn_3O_3$: 1.03%
$Na_2O$: 0.14%
$K_2O$: 0.01%

Type B contains four partitions and has the following composition:
$Al_2O_3$: 99.80%
$Na_2O + K_2O$: 0.15%
TYPE D contains five partitions and has the same composition as TYPE B.

Mechanical Strength

Supports of TYPE A, B and D having various porosities were prepared. Their mechanical strength was measured, i.e. the strength applied in a bisecting plane between two partitions which is necessary to crush the support.

| Catalyst | Porosity (cm$^3$/g) | Mechanical strength (kg) |
|---|---|---|
| $A_1$ | 0.127 | 53 |
| $A_2$ | 0.220 | 12 |
| $A_3$ | 0.143 | 24 |
| $B_1$ | 0.147 | 21.4 |
| $D_1$ | 0.183 | 25 |

The catalyst supports A and D have a height and a diameter of 15.5 mm and their partition and cylindrical walls have a thickness of 15 mm.

The catalyst support B has a diameter of 17 mm, a height of 18 mm, its cylindrical wall has a thickness of 1.8 mm and its partition a thickness of 1.5 mm.

It can be seen from the above table that catalyst $A_2$ which has a porosity of 0.220 cm$^3$/g has a mechanical strength lower than 20 kg, and therefore cannot be used without the risk of crushing.

Catalytic Activity

In these tests, methane is steam reformed at a very high spatial velocity so that the thermodynamic equilibrium of the reagents cannot be reached, thereby effectively demonstrating the differences in rate of reaction between catalysts. The measured residual content of methane is indicative of the catalyst activity, i.e. the more active the catalyst, the lower the methane content. Experiments were performed with a spatial velocity of 500 liters (STP) per liter of catalyst and with a steam/carbon ratio of 3 at various temperatures. Furthermore, catalysts were treated several times by steaming at 870° C. for 12 hours.

The tests were performed with catalysts $A_3$ and $B_1$ hereinabove defined, and for comparison, with catalysts $C_1$ and $C_2$.

Catalysts C are ring-shaped having a height and an external diameter of 15.9 mm and an internal diameter of 6.3 mm, and are prepared by tabletting. They have the following composition:

| | $C_1$ | $C_2$ |
|---|---|---|
| NiO | 21.6 % | 12% |
| $Al_2O_3$ | 67.10% | 88% |
| CaO | 11.80% | |
| $SiO_2$ | 0.21% | |
| $Na_2O + K_2O$ | 0.39% | |

The results are tabulated in Table 2. It is seen that even with lower nickel contents, the catalysts of this invention have for the most part a higher activity than catalysts C. Furthermore the deactivation rate of the catalysts of this invention is slower as can be inferred from the methane content at same temperature after a 24h working period and after several successive steaming steps.

TABLE 2

| Catalyst | Conditions | Residual Methane at Various Temperatures | | |
|---|---|---|---|---|
| | | 650 | 760 | 870 |
| $A_3$ at 10.2% of Ni | | | 2.18 | 0.75 |
| | After 24 h | | 2.90 | 1.42 |
| | After steaming 12h | | 2.73 | 0.7 |
| $B_1$ at 9.3% of Ni | | 6.03 | 1.42 | 0.26 |
| | After 24 h | 6.7 | 1.45 | 0.31 |
| | After steaming 12 h | 8.42 | 2.33 | 0.32 |
| | After steaming 12 h | 7.6 | 1.54 | 0.25 |
| | After steaming 12 h | 6.33 | 2.17 | 0.15 |
| $B_1$ at 6.5% of Ni | | 8 | 3.11 | 1.08 |
| | After 24 h | 9 | 3.1 | 1.06 |
| | After steaming 12 h | 13 | 3.48 | 0.75 |
| $B_1$ at 3.6% of Ni | | 9.07 | 2.61 | 0.69 |
| | After 24 h | 8.6 | 2.98 | 0.99 |
| $C_1$ at 21.6% of Ni | | 6.05 | 1.63 | 0.70 |
| | After 24 h | 7.84 | 2.18 | 0.85 |
| | After steaming 12 h | 11.8 | 4.21 | 1.07 |
| | After steaming 12 h | 13.75 | 5.32 | 1.43 |
| | After steaming 12 h | 15.3 | 5.4 | 1.43 |
| $C_2$ at 12% of Ni | | 6.41 | 1.51 | 0.25 |
| | After 24 h | 15.44 | 1.38 | 0.26 |
| | After steaming 12 h | 15.48 | 2.37 | 0.42 |
| | After steaming 12 h | 14.54 | 4.15 | 0.87 |

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof can made various changes and modifications of the invention to adapt it to various usages and conditions.

What is claimed is:

1. In a catalytic steam reformer process comprising reacting in a steam-reforming furnace at 500°–1000° C. a gaseous hydrocarbon with steam at a steam/carbon ratio of 2 to 5, to form hydrogen, the improvement wherein the reaction is conducted in contact with an impregnated nickel catalyst comprising a support containing at least 98% of alumina, having the shape of a cylinder containing at least four partitions located in radial planes and in which the porosity ranges between 0.08 and 0.20 cm$^3$/g, and 4 to 15% of nickel calculated as NiO with respect to the total weight of the catalyst, deposited by impregnation on the support.

2. A process according to claim 1, wherein the support contains four to seven partitions located in radial planes at equal angles.

3. A process according to claim 1, wherein the porosity of the support ranges between 0.12 and 0.15 cm$^3$/g.

4. A process according to claim 1, wherein the quantity of nickel deposited by impregnation ranges between 8 and 12%, calculated as NiO with respect to the total weight of the catalyst.

5. A process according to claim 1, wherein the support contains four partitions located in radial planes, the porosity of the support is 0.12 – 0.15 cm$^3$/g, the quantity of nickel deposited by impregnation is 8–12% calculated as NiO with respect to the total weight of the catalyst, and both the diameter and height of the catalyst is 10–20 mm.

6. A process according to claim 1, wherein said gaseous hydrocarbon is methane.

7. A process according to claim 1, wherein the catalyst is regenerated with steam at intervals during the reaction, and the activity of the catalyst remains substantially constant after a prolonged reaction time and after several regenerations of the catalyst.

8. A process according to claim 7, wherein said gaseous hydrocarbon is methane.

* * * * *